A. FAY.
MEANS FOR PREPARING FOOD PRODUCTS.
APPLICATION FILED JULY 25, 1917.
1,251,878.
Patented Jan. 1, 1918.
2 SHEETS—SHEET 1.
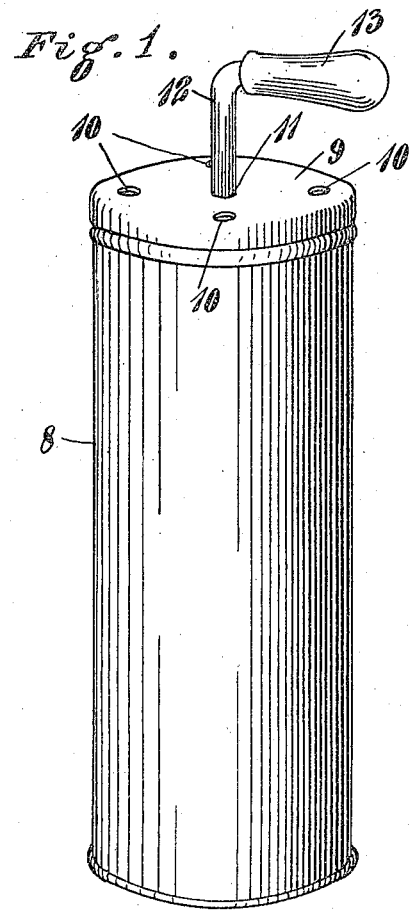
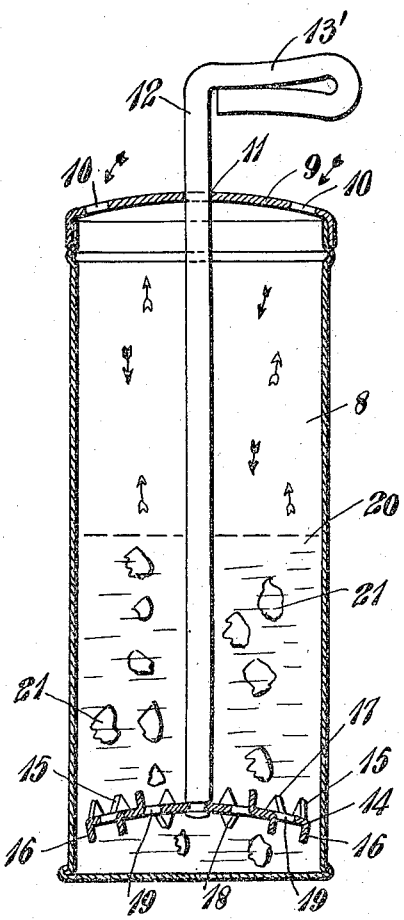
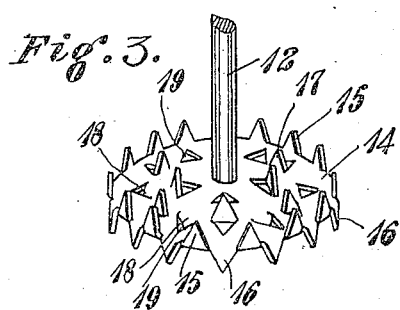
Witnesses:
Clarence Perdew
Hiler S. Fay
Inventor
Alphons Fay A. FAY.
MEANS FOR PREPARING FOOD PRODUCTS.
APPLICATION FILED JULY 25, 1917.
1,251,878.
Patented Jan. 1, 1918.
2 SHEETS—SHEET 2.
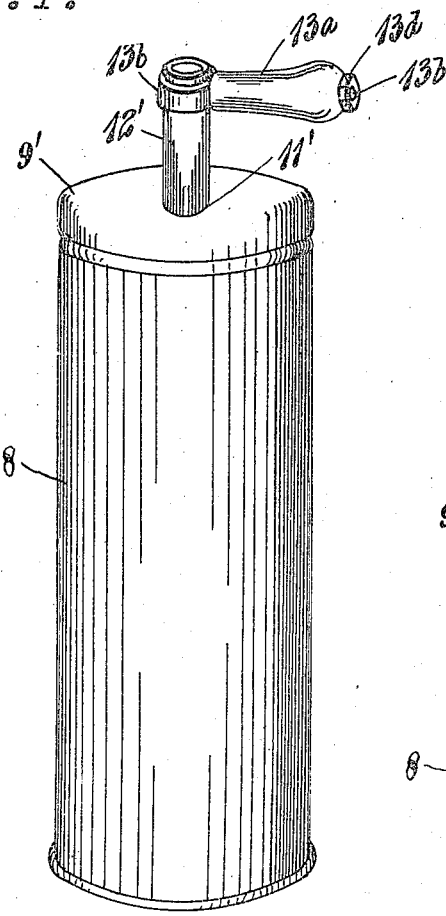
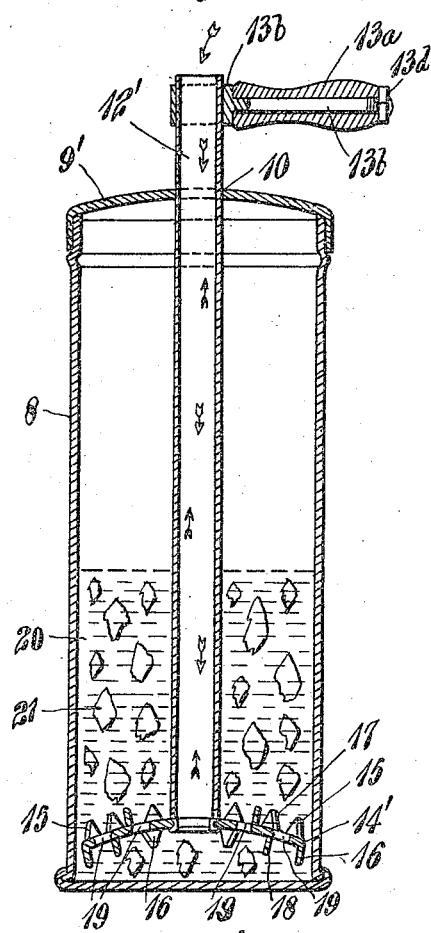
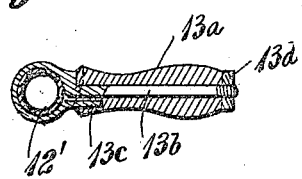
Witnesses:
Inventor
Alpheus Fay

UNITED STATES PATENT OFFICE.

ALPHEUS FAY, OF LOUISVILLE, KENTUCKY.

MEANS FOR PREPARING FOOD PRODUCTS.

1,251,878. Specification of Letters Patent. Patented Jan. 1, 1918.

Application filed July 25, 1917. Serial No. 182,676.

*To all whom it may concern:*

Be it known that I, ALPHEUS FAY, a citizen of the United States, and a resident of Louisville, in the county of Jefferson and State of Kentucky, have invented a certain new and useful Means for Preparing Food Products, of which the following is a specification.

My invention relates to means for preparing food products for table use in the ways that butter is ordinarily used, as well as in the way that confections, jellies, preserves and the like are used; whereby the product will have not only fatty properties but the properties of the "lean" parts of food-stuffs as well as a sweet content, which latter will not only add to the attractiveness of the product but which will act as a preservative of it.

My invention consists in the improved means for preparing said product as will hereinafter be more fully described and claimed.

In the drawing:

Figure 1 is a perspective view of apparatus suitable for the making of this product;

Fig. 2 is a vertical cross-section of the same, but showing a slightly modified handle;

Fig. 3 is a detail perspective view of the combined dasher and disintegrator;

Fig. 4 is a perspective view of modified apparatus.

Fig. 5 is a vertical cross-section of the same; and

Fig. 6 is a horizontal cross-section through the handle on a plane corresponding to the line 6—6 of Fig. 5.

The fundamental principle of the method is the heating of a plurality of substances together, and agitation of the substances, thus thoroughly commingling them and rendering them substantially connatural, in the form of an emulsion, but of about the consistency of pure natural butter. This broad principle is disclosed and claimed broadly in my Patent No. 847,563, of March 19, 1907.

The best means of applying the heat is a water bath, and any suitable mechanical agitation will produce a serviceable product. It is highly desirable, however, to use the simple, yet efficient, apparatus illustrated herein.

As shown in Figs. 1 to 3, inclusive, this apparatus comprises a vessel 8 preferably of tall and narrow cylindrical shape having a lid 9 that fits snugly on its top, and which lid has a series of openings 10 in it out near its periphery, and an opening 11 in its center through which extends a stem 12 having upon its upper end a handle such as the handle 13 of Fig. 4 or the handle 13' of Fig. 5; and having fixed on its lower end a combined dasher and disintegrator 14. This element 14 is preferably made, as shown, out of a single circular sheet of metal made slightly concavo-convex with its concave side downward and having the lower end part of the stem 12 extending through its center and riveted thereunder. Around its periphery, this disk has a series of alternately upwardly and downwardly bent flat triangular sharp teeth 15 and 16; while throughout its interior part it has a substantially evenly distributed plurality of upwardly and downwardly bent flat triangular sharp teeth 17 and 18 formed by cutting through the metal on two sides of a triangle and bending the tooth up or down as the case may be on the third side of the triangle; thus leaving openings 19 through the disk that have sharp corners to better act on the substances passing through the openings.

In the modification shown in Figs. 4 to 6, inclusive, the vessel 8 is similar to that of the first example, but the lid 9' is without the openings 10, and the opening 11', in its center has extending through it a tubular stem 12'.

The upper end of the tubular stem is open, and the handle 13ª has a hook-bolt 13ᵇ extending through it and hooking around the tubular stem 12' with a lug 13ᶜ entering the adjacent end of the handle alongside the main part of the bolt; so that when the nut 13ᵈ at the outer end of the handle is drawn up on the bolt, the hook is drawn tightly around the tubular stem 12' by the reaction of the lug 13ᶜ in the handle. The handle is thus readily removable to allow the handle to be withdrawn from the lid, or may be readily adjusted up or down on the stem.

The element 14' is fastened on the lower end of the tubular stem by beading the stem inside the central opening in the element, so that the lower end of the stem is left open. This element 14' is otherwise like the element 14 of the other example, having the upwardly extending teeth 15 and 17 and downwardly extending teeth 16 and 18 and the openings 19 through its interior part.

By having the stem 12' tubular, the air is drawn in through this stem very effectively at each upward stroke and forced out therethrough at each downward stroke; thus causing the inflow and outflow of air to be from and to the remote interior parts of the body of liquid and affording a more thorough aeration of the liquid and fatty particles.

With the apparatus thus constructed, and with the solution 20 of milk elements and sweet elements in it to about half its height, as indicated by the heavy dotted line in Fig. 5, the butter or other fatty element is placed therein in moderate sized pieces 21; the solution 20 having previously been brought to the proper tepid temperature by placing the vessel 1 in an outer body of water at a slightly higher temperature. It may be removed from this body of water during the remainder of the process, as the process is completed quickly, before a material fall in temperature of the substance.

Then with the lid 2 in place on the vessel and forming a guide for the stem 12, the combined dasher and disintegrator is worked rapidly up and down in the vessel by grasping the handle; the stroke of this element 14 preferably being most of the height of the vessel, so that the bottom of the element 7 makes impact with the upper surface of the liquid 20 and the pieces 21 of butter or other fatty substance. The result is that the upwardly and downwardly projecting teeth 15 and 16, and 17 and 18, respectively, cut into and disintegrate the butter or other fatty pieces at each upward and downward stroke, while air is drawn into the vessel through the openings 10 at each downward stroke, to be forced through the liquid and into intimate contact with the liquid particles and the fatty particles on account of the travel of both the liquid and fatty particles through the openings 19 in the element 14 and around the edges of the disk. At each upward stroke, this travel of the air and liquid and fatty particles through the openings 19 is in the other direction, and some of the air is forced out of the vessel through the openings 10 making place for other air to be drawn in at the next downward stroke.

This operation of the device is continued for about 5 or 10 minutes or until the element 7 begins to be perceptibly retarded in its travel up and down through the body of substances, when it will be known that the substances are merging in the form of the completed product. The operation should be continued for one or two minutes after this is noticed, in order to insure that the merging is complete. Upon completion, the product will be found to be of a slight fluid, though plastic, consistency, allowing it to be poured, yet without any of the faults of melted butter, and absolutely free from all tendency of the liquid and fatty ingredients to separate; it forms a perfect mixture, adapted, when reaching ordinary low temperature, to assume the consistency of the most approved pure butter.

A marked advantage of the fluid, yet plastic, condition of the preparation on completion of the operation of homogenizing, is the facility with which it may be worked into attractive marketable shape while cooling, as by molding. It is only necessary to pour it into the molds, instead of pressing, as with pure butter, thus attaining the convenience that would be had by melting, yet avoiding the evil consequences of such treatment. It will be readily understood that the substance in its semi-liquid form may be left to be molded in the vessel 1 or may be poured therefrom into any other suitable mold, so that it will have a desirable shape when it solidifies.

Where the product is intended for making ice cream and some other confections, it is generally desirable, if butter is used as the fatty ingredient of the product, that this butter should not contain salt.

Where the butter has been salted, the salt can be removed by first placing the butter in a body of pure water in the vessel of either apparatus, with the water at or below ordinary temperature, and operating the agitator or dasher to thoroughly disintegrate the butter and mingle its particles with those of the water and of air that is drawn in incident to the operation, which will result in a granulation of the butter and a washing out of practically every substance from the butter fat, including the salt and any milk elements other than butter fat which had been retained in the butter when it was made, and which either have or may become rancid, and which would shorten the time during which the product will be preserved.

Then after the butter has been thoroughly washed and all salt and rancidity removed, the water and butter may be taken out of the vessel, and, after the vessel is washed, the solution of milk and sweet elements may be made in the vessel as hereinbefore described, ready to receive the butter, which, removed from the washing water, will be in granulated condition well adapted to be quickly merged with the solution.

While having all of these advantages, the apparatus required is extremely simple and inexpensive, and the process is simple and easy and may be very quickly performed.

This makes the invention well adapted for household use, and it is for this purpose that it is especially intended; although it will be understood that under proper regulation the product may be produced, packed in sealed containers, and marketed on an extensive scale. As a household process, however, the benefits are to be amply realized.

Along with these advantages the cost is lessened, since the cost of the mixture is only an average of the cost of the fatty ingredients, the cost of the sweet elements, and the cost of the milk. The extreme simplicity of the apparatus, and of the process, well adapts them for domestic use, for which purpose the apparatus is especially designed. The apparatus of Figs. 1 and 2 will also be found suitable for other culinary uses, as mixing, stirring, beating, or churning, in small quantities usually involved in domestic operations. For such purposes, the vessels 4 and 5 may be used alternatively, along with the lid 3, using the small inside vessel for small quantities, without the large outer vessel, or using the larger outer vessel for larger quantities, without the small inner vessel.

The apparatus is suitable for other purposes, as for churning small quantities of butter and for mixing any ingredients, beating eggs, whipping cream, mashing potatoes, and other operations where an efficient sanitary agitating or disintegrating device is needed.

Having fully described my invention, what I claim as new and desire to secure by Letters Patent is:

1. In a device of the character described, in combination with a comparatively tall and narrow container with an opening in its top, an element constituting a combined dasher and disintegrator lying across the interior of said container, a stem fixed to said element substantially centrally thereof and extending through said opening in said top of said container for reciprocating said element up and down in said container, and flat triangular sharp teeth extending from said element substantially parallel with said stem throughout the length of each of said teeth.

2. In a device of the character described, in combination with a comparatively tall and narrow container with an opening in its top, an element constituting a combined dasher and disintegrator lying across the interior of said container, a stem fixed to said element substantially centrally thereof and extending through said opening in said top of said container for reciprocating said element up and down in said container, and flat triangular sharp teeth turned out from the interior of said element between the attachment of said stem thereto and the periphery of said element, leaving triangular openings in said element adjacent to the respective teeth, for the purpose set forth.

ALPHEUS FAY.

Witnesses:
CLARENCE PERDEW,
IRENE PARKER.

Copies of this patent may be obtained for five cents each, by addressing the "Commissioner of Patents, Washington, D. C."